United States Patent [19]
Haney

[11] 4,355,444
[45] Oct. 26, 1982

[54] TIE CONNECTORS

[76] Inventor: Ivan L. Haney, 600 W. Orange, Greenville, Mich. 48838

[21] Appl. No.: 134,978

[22] Filed: Mar. 28, 1980

[51] Int. Cl.³ ............................................. F16G 11/04
[52] U.S. Cl. ...................................... 24/129 B; 24/130
[58] Field of Search ................. 24/129 B, 130, 129 R, 24/129 A

[56] References Cited

U.S. PATENT DOCUMENTS

| | | | |
|---|---|---|---|
| 479,509 | 6/1892 | Heaphy | 24/130 |
| 656,431 | 8/1900 | Stewart | 24/129 B |
| 3,714,923 | 2/1973 | Mariani | 24/129 B |

FOREIGN PATENT DOCUMENTS 8099 of 1915 United Kingdom ............. 24/129 B

*Primary Examiner*—Alexander Grosz
*Attorney, Agent, or Firm*—Glenn B. Morse

[57] ABSTRACT

The described modifications of tie connectors are adapted to receive a rope, strap, chain, or other flexible tension member. A portion of the connectors establishes the alignment of the unit with respect to the line of tension, and another portion is provided with a laterally-open converging slot functioning as a jam cleat.

2 Claims, 14 Drawing Figures

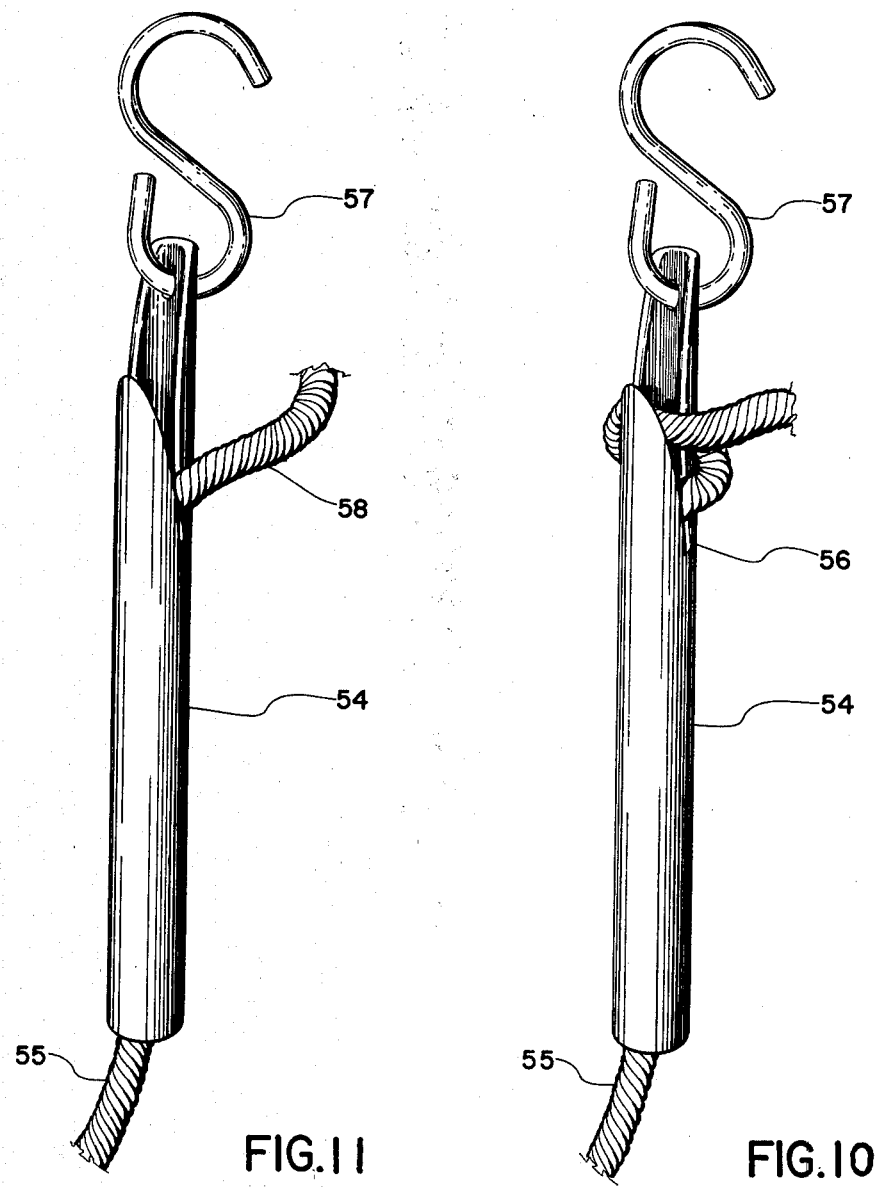

TIE CONNECTORS

BACKGROUND OF THE INVENTION

Devices for securing cords to eliminate the tying of knots are quite old. Most of these have the advantage that they are much easier to engage and disengage, and require far less skill and dexterity, than ordinary rope work. In fact, the value of these devices is largely determined by the degree to which these advantages are provided. Cost, of course, must be minimal. Most of the known devices secure by the usual principles associated with the deck cleats of boats. Examples of the usual forms of these units are shown in the following U.S. Patents:

Bardon, U.S. Pat. No. 488,302, 1892;
Stewart, U.S. Pat. No. 656,431, 1900;
Nuttall, U.S. Pat. No. 837,247, 1906;
Bauer, U.S. Pat. No. 1,426,537, 1922;
Kocska, U.S. Pat. No. 1,915,060, 1933;
Gaus, U.S. Pat. No. 1,929,843, 1933;
Showers U.S. Pat. No. 2,048,300, 1936;
Chatterton, U.S. Pat. No. 2,458,252, 1949;
Ballock, Sr. U.S. Pat. No. 3,520,988, 1970;
Nuse, U.S. Pat. No. 3,675,276, 1972;
Fishack, U.S. Pat. No. 3,953,911, 1976;
Hess, U.S. Pat. No. Des. 218,959, 1970;
Chappuis-Swiss U.S. Pat. No. 592,551, 1977.

SUMMARY OF THE INVENTION

In one modification of the invention, the alignment of the connector with respect to the line of tension is provided by a laterally-open slot in a plate. This slot freely receives the tension member, which is then engaged with a laterally-open converging slot acting as a jam cleat. The first slot is angularly oriented with respect to the line of tension to induce a centering action tending to locate the connector with respect to the line of tension, and thus eliminate the effects of varying placement of the tension member in the jamming portion. Preferably, similar configurations are provided at opposite ends of the plate, with the converging slots overlapping to conserve material. Modified forms of the invention receive the tension member between spaced walls that are themselves provided with the jamming slots. The reception of the tension member between the walls thus establishes the orientation of the connector, in conjunction with a connecting point in alignment with these walls.

DESCRIPTION OF THE DRAWINGS

FIG. 10 shows a modified form of the invention involving a tubular member, with a line fully engaged.

FIG. 11 shows the intermediate condition in the engagement of the FIG. 10 device.

DESCRIPTION OF THE PREFERRED EMBODIMENTS

Figure 1:
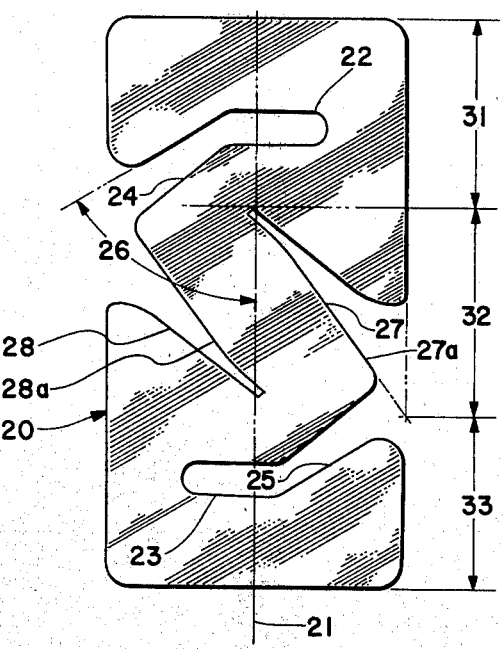
FIG. 1 is a plan view of a plate incorporating alignment and jamming portions at opposite ends.
Figure 2:
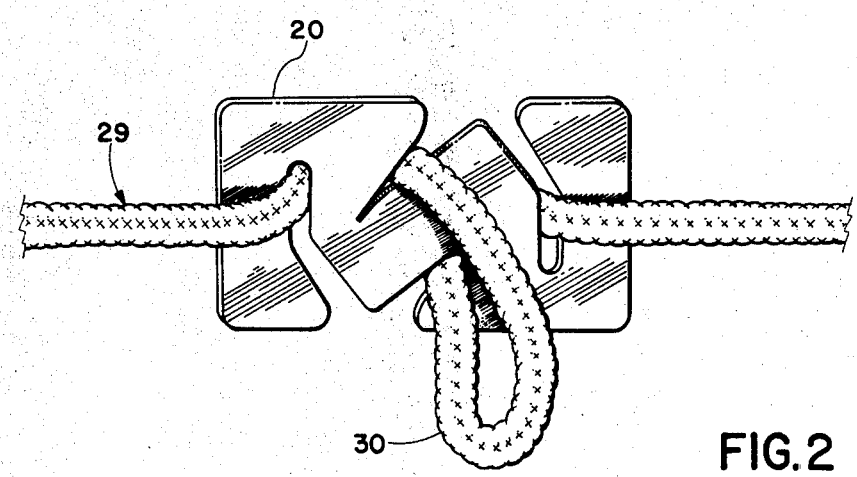
FIG. 2 shows the use of the plate of FIG. 1 as a line-shortening device.
Figure 3:
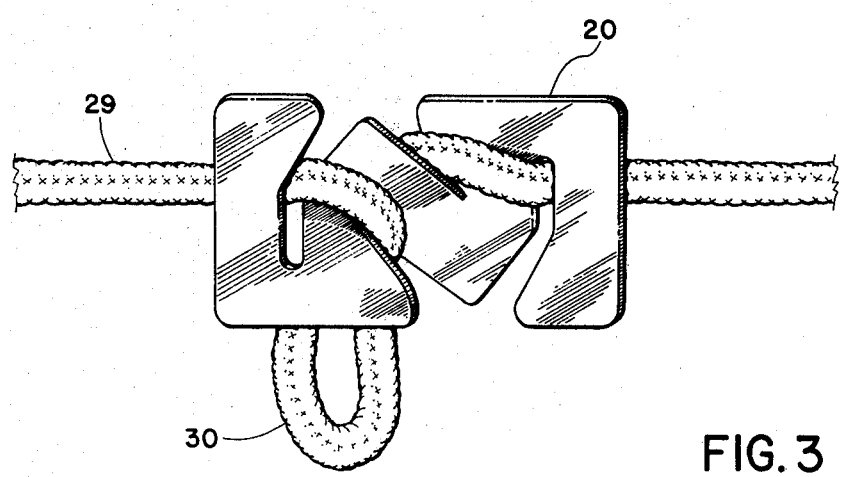
FIG. 3 is a review of the reverse side of the installation shown in FIG. 2.

The connector illustrated in FIG. 1 is in the form of a flat plate 20, with notches in the edges of the plate providing the characteristic configuration. The central axis 21 of the plate may be regarded as the axis of tension when the plate is engaged with a tension member as indicated in FIGS. 2, 3, 8, 12, 13, and 14. A tension member is preferably engaged first with either of the slots 22 or 23. These are similar in configuration, except for a right-left relationship. At least the entrance portions 24 and 25 of these slots, which are laterally-open, are angularly oriented with respect to the tension axis 21 such that the angle 26 is substantially less than ninety degrees. This relationship provides a centering action for the tension member tending to localize it so that the axis of tension then coincides with the central axis of the plate 20. The slot then functions as a point of connection. When the tension member has been thus engaged, it is then bent and pulled into the converging slot 27, if it were engaged with the first slot 24; or with the slot 28, if with the slot 23. A strong pull on the tension member tending to urge it into the slot produces a jamming action that secures the tension member with respect to the plate. FIG. 2 illustrates the installed relationship, where the tension member 29 is continuous, the plate being used to shorten the tension member with a slack loop indicated at 30. If desired, the entrance portion 24 may be combined with the inner portion of the slot 22 to produce a continuous arcuate configuration having the same effect. With this arrangement, the more or less random position of the tension member in the engagement with the converging slot 27 will not tend to induce a rotation of the plate, and thus produce a danger of disengagement. The limitations of the angle 26 at the entrance portion will vary somewhat with changes in the proportions of the plate, noteably the length, which effects the distance between the opposite slots 22 and 23. In the illustrated configuration, however, the angle 26 is best kept to less than sixty degrees.

In designing a plate of the type shown in FIG. 1 for the best utilization of material, the length of it can be laid out in three essentially equal portions, as indicated at 31, 32, and 33. The intersection of the transverse lines representing these divisions with the central axis gives the location of the inner extremities of the converging slots 27 and 28. The edges 27a and 28a of these slots can then be located at the intersection of the projections of the edge of the plate with these lines representing the length divisions 31, 32, and 33. This layout method is approximate, but has been found to have good practical value. Preferably, the open ends of the slots are rounded to facilitate the engagement with the tension member. The resulting configuration results in an overlap between the slots 27 and 28, and produces a very effective and economical use of material.

Figure 4:
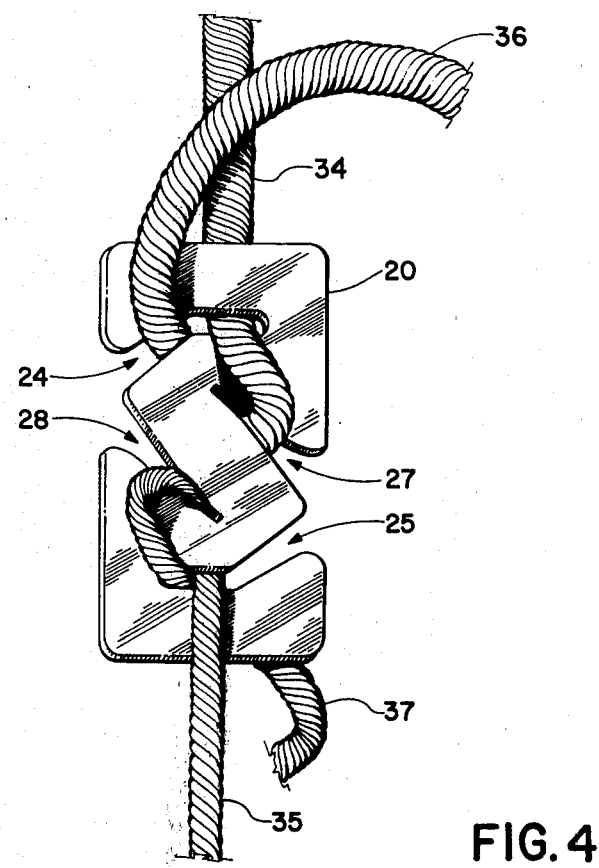
FIG. 4 shows the FIG. 1 plate in use for connecting two separate lines.

Referring to FIG. 4, the plate 20 having the proportions shown in FIG. 1 is engaged with the two tension members 34 and 35 to transmit tension between them. FIG. 4 illustrates the arrangement which provides an auxiliary locking effect after the tension members 34 and 35 are engaged with the slots 27 and 28. The free ends 36 and 37 are respectively brought around and engaged with the locating slots 24 and 25. If desired, the locking may be rendered more positively by the manner in which the free end 37 is engaged so that it is held in confinement by the cord 35.

Figure 5:
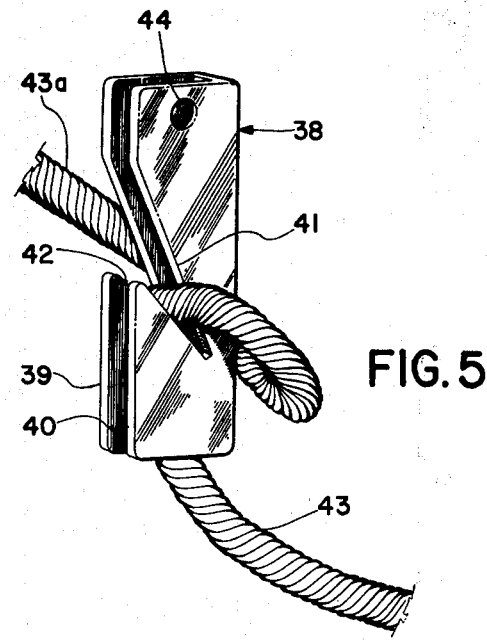
FIG. 5 illustrates a modified form of the invention, with the line partially installed in the device.
Figure 6:
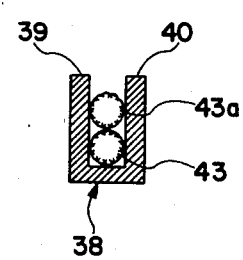
FIG. 6 is a section through the FIG. 5 modification, showing the line fully installed.
Figure 7:
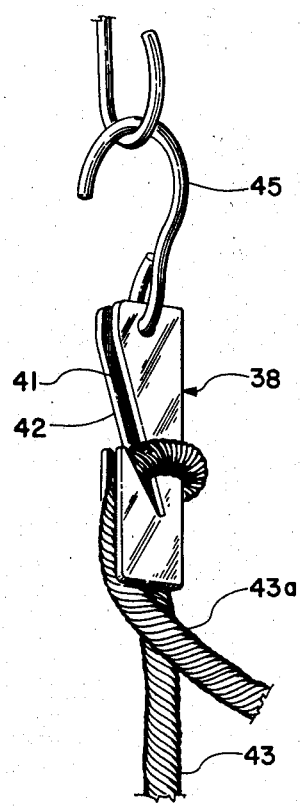
FIG. 7 is a perspective view showing the fully installed line in the FIG. 5 device, as indicated in FIG. 6.
Figure 8:
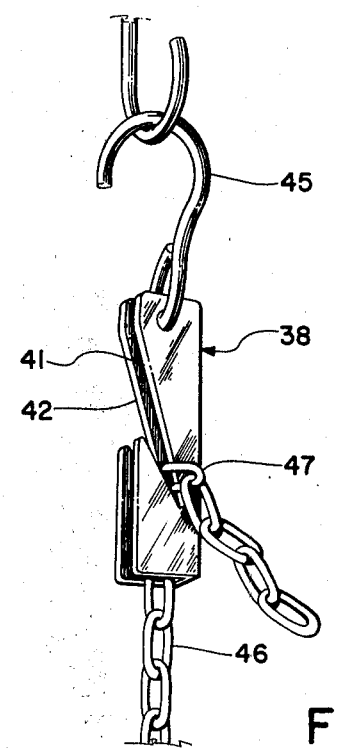
FIG. 8 is a perspective view showing the device of FIGS. 5 and 7 engaged with link chain.
Figure 9:
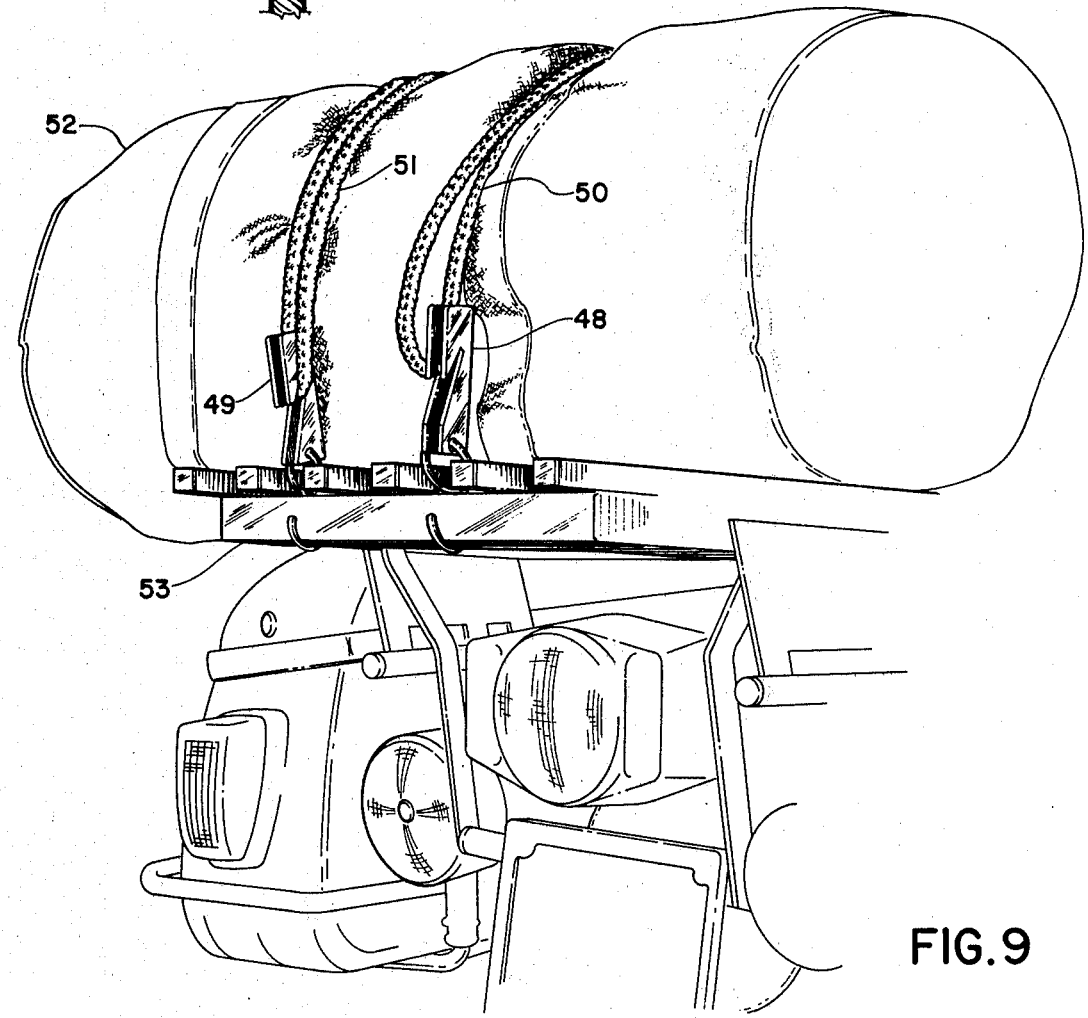
FIG. 9 shows the rear end of a motorcycle, with devices of the type shown in FIG. 7 used to secure the elastic cords holding a duffel bag in position.

Referring to FIGS. 5 through 9, a modified form of the connector is based upon a channel-shaped body portion 38 providing the spaced walls 39 and 40. Each of these walls has a laterally-open converging slot, as shown at 41 and 42, which are in opposite relationship. In this modification, the line of tension is established as a line between the point where a tension member 43 is gripped by the slot 41, and the connecting point 44 adjacent the upper end of the device, as shown in FIG. 5. The hole providing the connecting point 44 is usually engaged by a hook as shown at 45 in FIG. 7. Under normal conditions, the engagement with just the slot 41, as shown in FIG. 5, will establish the necessary grip to maintain tension. To further assure that the device remains engaged with the cord 43, the free end 43a may be wrapped around the body portion 38, and brought across to engage both the slots 41 and 42 in the manner shown in FIG. 7. FIG. 8 illustrates the manner in which the same device may be engaged with a conventional link chain. The chain 46 is first laid between the spaced walls 39 and 40, and then a selected link 47 is placed in transverse relationship so that it is gripped securely in the convergence of the slots 41 and 42. In FIG. 9, the devices 48 and 49 are respectively engaged with the cords 50 and 51 to secure a duffel bag 52 on the rear platform 53 of a motorcycle. The units 48 and 49 are of the type shown in FIG. 7.

FIGS. 10 and 11 illustrate modified forms of the invention in which the effect of the spaced walls 39 and 40 is provided by the opposite sides of the tubular member 54. The fully engaged position of the cord 55 is shown in FIG. 10, with the intermediate position appearing in FIG. 11. Under usual circumstances, the partial engagement of FIG. 11 will suffice to transmit the necessary tension in the absence of substantial vibration or outside interference. The portion of the tubular member 54 extending beyond slot 56 is provided with a hole forming a connecting portion for the hook 57. To fully secure the cord 55, the free end 58 is brought around the tubular member 54, and engaged across the slot 56, which intersects the opposite sides of the tubular member 54.

Figure 12:
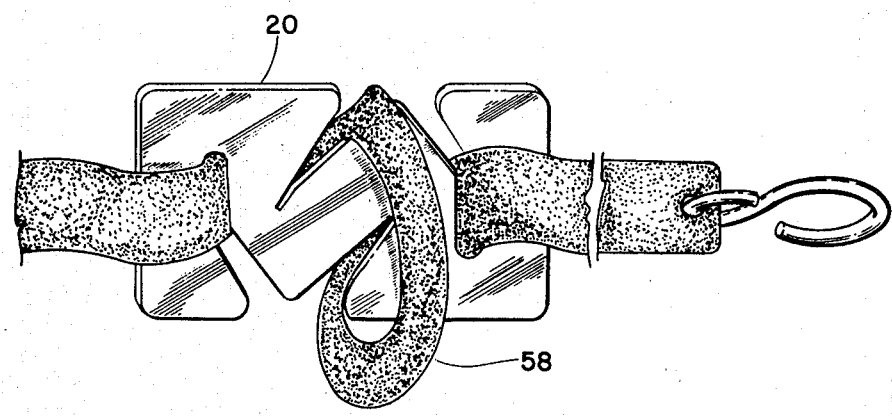
FIG. 12 shows a device of the type illustrated in FIG. 1, engaged with a strap.
Figure 13:
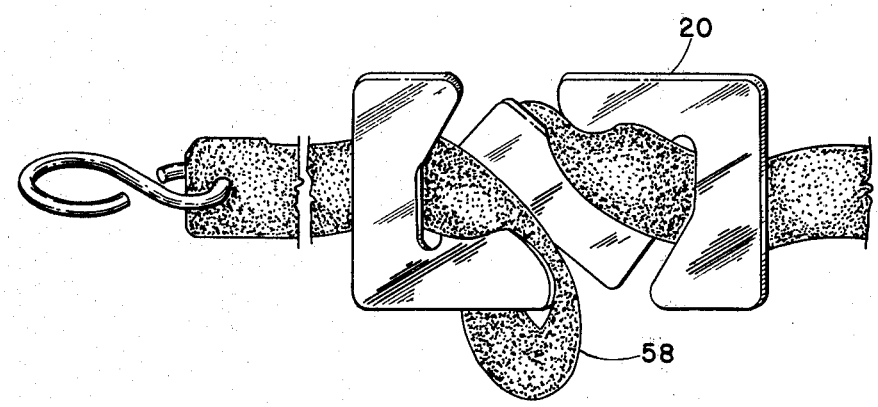
FIG. 13 is a view of the reverse side of the assembly shown in FIG. 12.
Figure 14:
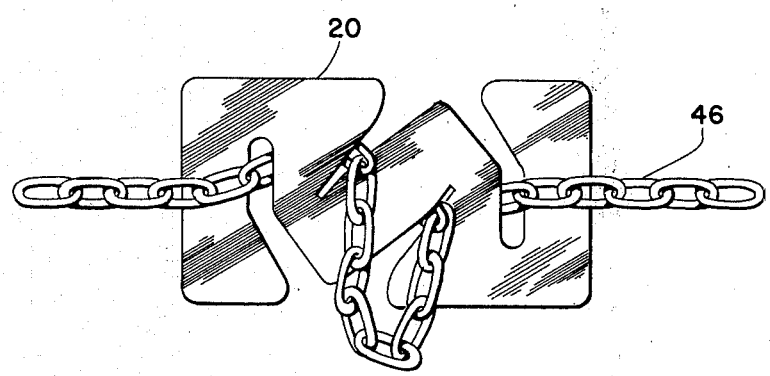
FIG. 14 is a view showing the FIG. 1 connector engaged with a link chain.

In FIG. 12, the plate illustrated in FIG. 1 is shown engaged with a flat strap 58 which is clamped in the converging portion of the device in the same manner as an ordinary cord. The reverse side of this assembly shown in FIG. 13 illustrates the half-turn necessary to engage both the locating and clamping slots. In FIG. 14, the same plate is shown engaged with a chain, with one link preferably arranged transversely to the remainder of the chain. This, however, is not necessary, as the reception of one link within a converging slot will provide the obstacle presented by the end of the next link, which is inherently in a transverse relationship.

Devices of the type illustrated in the drawings have been used very effectively in conjunction with a member of applications, including the following:
  Tent and Shelter Tie-Downs
  Baggage Securing
  Mooring Line Attachments for Boats
  Anchor Rope Terminals
  Running Rigging on Sailboats
  Towing Arrangements
  Freight or Tarp Holding
  Clothes Line Attachments
  Tethers for Pets and Livestock
  Airplane Tie Downs It appears that one of the significant advantages of the devices described is the ability to withstand a tension approaching the full strength of the various cords, chains, and so forth, while retaining the ability to be quickly and easily disengaged. The laterally-open slots with the illustrated angular relationships appear to be responsible for this feature.

I claim:

1. In combination with a flexible tension member, a connector plate having two longitudinally spaced apart connecting points establishing an axis of tension transmission, the improvement comprising:
  one of said connecting points being formed by a laterally open, connecting point forming slot, in a side of said plate, at least the outer part of said slot being inclined to the axis of tension by an angle of less than ninety degrees, measured toward the other of said connecting points, said plate having a jam cleat forming, laterally open slot disposed in the side of the plate opposite to the side containing the connecting point forming slot, said jam cleat forming slot converging inwardly towards the axis of tension and being inclined relative to the axis of tension by an angle less than ninety degrees, measured toward the other of said connecting points, said jam cleat forming slot converging to a width less than the minimum transverse dimension of said tension member, whereby tension on said member tends to pull and jam said member into the converging inner portion of said jam cleat forming slot.

2. A combination as defined in claim 1, wherein both connecting points are formed by laterally open, inclined, connecting point forming slots, disposed on opposite sides of said plate, and two substantially parallel, jam cleat forming converging slots are provided, said jam cleat forming slots opening on opposite sides of said plate.

* * * * *